US012597038B2

(12) United States Patent
Khatwani

(10) Patent No.: US 12,597,038 B2
(45) Date of Patent: Apr. 7, 2026

(54) REAL TIME INTERACTION PROCESSING SYSTEM AND METHOD

(71) Applicant: Visa International Service Association, San Francisco, CA (US)

(72) Inventor: Shalini Khatwani, Singapore (SG)

(73) Assignee: Visa International Service Association, San Francisco, CA (US)

( * ) Notice: Subject to any disclaimer, the term of this patent is extended or adjusted under 35 U.S.C. 154(b) by 943 days.

(21) Appl. No.: 17/256,920

(22) PCT Filed: Jun. 28, 2019

(86) PCT No.: PCT/US2019/039923
§ 371 (c)(1),
(2) Date: Dec. 29, 2020

(87) PCT Pub. No.: WO2020/009944
PCT Pub. Date: Jan. 9, 2020

(65) Prior Publication Data
US 2021/0279734 A1 Sep. 9, 2021

Related U.S. Application Data

(60) Provisional application No. 62/694,622, filed on Jul. 6, 2018.

(51) Int. Cl.
*G06Q 20/40* (2012.01)

(52) U.S. Cl.
CPC ..... *G06Q 20/4097* (2013.01); *G06Q 20/4014* (2013.01); *G06Q 20/4016* (2013.01); *G06Q 20/4037* (2013.01); *G06Q 20/405* (2013.01)

(58) Field of Classification Search
CPC ........... G06Q 20/4097; G06Q 20/4014; G06Q 20/4016; G06Q 20/4037; G06Q 20/405;
(Continued)

(56) References Cited

U.S. PATENT DOCUMENTS 6,014,646 A * 1/2000 Vallee ................ G06Q 20/3678
705/69
8,019,685 B2 * 9/2011 Patterson ............... G06Q 20/10
705/76
(Continued)

FOREIGN PATENT DOCUMENTS

CN 105264558 A 1/2016
CN 107430731 A 12/2017
(Continued)

OTHER PUBLICATIONS

CN201980045399.6 , "Office Action", Sep. 27, 2022, 19 pages.
(Continued)

*Primary Examiner* — Yingying Zhou
(74) *Attorney, Agent, or Firm* — Kilpatrick Townsend & Stockton LLP

(57) ABSTRACT

Described herein are methods and systems directed to enabling resource providers to interact with access credentials that the resource provider is typically not capable of interaction with. In some embodiments, a virtual account identifier is issued in association with the access credential, the virtual account identifier being issued by an authorization provider which is different from the authorization provider having issued the access credential. The virtual account identifier may be provided to the resource provider in lieu of the access credential. The resource provider may then generate an authorization request message that includes the virtual account identifier, which may be routed to the authorization provider associated with the virtual account identifier. That authorization provider may then conduct the transaction using the access credential with the authorization provider having issued the access credential.

16 Claims, 6 Drawing Sheets

<u>300</u>

(58) Field of Classification Search

CPC .............. G06Q 20/023; G06Q 20/102; G06Q 20/3223; G06Q 20/385; G06F 21/36; G06F 21/34; H04L 63/08

See application file for complete search history.

(56) References Cited

U.S. PATENT DOCUMENTS

| | | | | | |
|---|---|---|---|---|---|
| 8,429,048 | B2 * | 4/2013 | Singh | ..................... | G06Q 20/42 705/35 |
| 8,596,547 | B2 * | 12/2013 | Diamond | ............. | G06Q 20/347 235/487 |
| 9,613,377 | B2 * | 4/2017 | Sheets | .................. | G06Q 20/363 |
| 9,830,582 | B1 * | 11/2017 | Barrett | ................... | G06Q 20/20 |
| 10,360,551 | B1 * | 7/2019 | Perry | ..................... | G06Q 20/20 |
| 2011/0258111 | A1 * | 10/2011 | Raj | ......................... | G06Q 40/00 705/39 |
| 2013/0297511 | A1 * | 11/2013 | Monk | .................... | G06Q 20/28 705/44 |
| 2014/0136353 | A1 * | 5/2014 | Goldman | ............. | G06Q 20/227 705/16 |
| 2014/0358783 | A1 | 12/2014 | Mansur | | |
| 2015/0235211 | A1 | 8/2015 | Hurry et al. | | |
| 2016/0092872 | A1 * | 3/2016 | Prakash | ............... | G06Q 20/322 705/65 |
| 2016/0140542 | A1 | 5/2016 | Hammad | | |
| 2016/0148212 | A1 * | 5/2016 | Dimmick | ........... | G06Q 20/4014 705/44 |
| 2016/0232527 | A1 * | 8/2016 | Patterson | ............. | G06Q 20/405 |
| 2017/0337549 | A1 * | 11/2017 | Wong | ................. | G06Q 20/3821 |
| 2017/0338965 | A1 * | 11/2017 | Gaddam | ............... | H04L 9/3263 |
| 2018/0018660 | A1 * | 1/2018 | Gomes | .................. | H04L 63/102 |
| 2020/0042975 | A1 * | 2/2020 | Gueorguiev | ......... | G06Q 20/363 |

FOREIGN PATENT DOCUMENTS

| | | |
|---|---|---|
| KR | 20180001224 | 1/2018 |
| WO | 2017184121 A1 | 10/2017 |

OTHER PUBLICATIONS

Application No. CN201980045399.6 , Office Action, Mailed On Apr. 27, 2023, 7 pages.

Application No. SG11202100067Q , Written Opinion, Mailed On May 31, 2023, 8 pages.

Application No. PCT/US2019/039923 , International Search Report and Written Opinion, Mailed On Oct. 22, 2019, 11 pages.

IN202147004525 , "First Examination Report", Sep. 26, 2022, 6 pages.

SG11202100067Q , "Written Opinion", Sep. 28, 2022, 9 pages.

EP19830437.0, "Extended European Search Report", Jul. 15, 2021, 11 pages.

EP19830437.0, "Communication pursuant to Rules 70(2) and 70a(2)", Aug. 3, 2021, 1 page.

Application No. CN201980045399.6 , Notice of Decision to Grant, Mailed On Jul. 31, 2023, 4 pages.

Application No. SG11202100067Q , Further Written Opinion, Mailed On Aug. 15, 2023, 8 pages.

* cited by examiner

300

400

INSTALL SOFTWARE APPLICATION
SUPPORTED BY AUTHORIZATION
PROVIDER                                    402

PROVIDE ACCOUNT IDENTIFIERS AND
CREDENTIALS                                 404

RECEIVE VIRTUAL ACCOUNT IDENTIFIER          406

PUSH VIRTUAL ACCOUNT IDENTIFIER TO
OTHER APPLICATIONS                          408

600

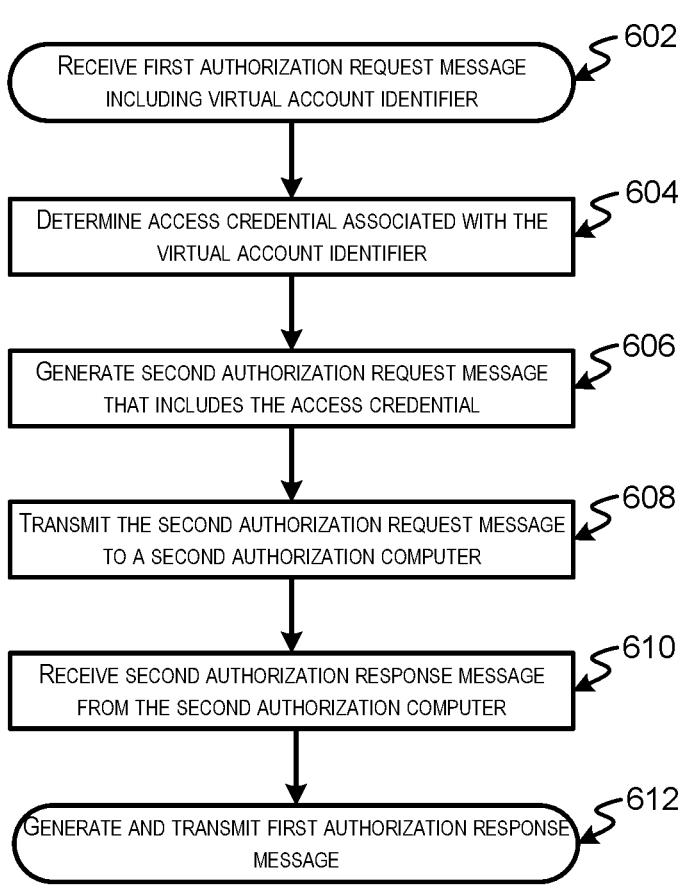

RECEIVE FIRST AUTHORIZATION REQUEST MESSAGE INCLUDING VIRTUAL ACCOUNT IDENTIFIER
602

DETERMINE ACCESS CREDENTIAL ASSOCIATED WITH THE VIRTUAL ACCOUNT IDENTIFIER
604

GENERATE SECOND AUTHORIZATION REQUEST MESSAGE THAT INCLUDES THE ACCESS CREDENTIAL
606

TRANSMIT THE SECOND AUTHORIZATION REQUEST MESSAGE TO A SECOND AUTHORIZATION COMPUTER
608

RECEIVE SECOND AUTHORIZATION RESPONSE MESSAGE FROM THE SECOND AUTHORIZATION COMPUTER
610

GENERATE AND TRANSMIT FIRST AUTHORIZATION RESPONSE MESSAGE
612

FIG. 6

REAL TIME INTERACTION PROCESSING SYSTEM AND METHOD

CROSS-REFERENCE TO RELATED APPLICATIONS

This application is a 371 National Phase of PCT Patent Application No. PCT/US2019/039923 filed Jun. 28, 2019 which claims priority to U.S. Patent Application No. 62/694,622, filed on Jul. 6, 2018, the disclosures of which are herein incorporated by reference in their entirety for all purposes.

SUMMARY

Embodiments of the invention are directed to methods and systems that enable transactions to be conducted using an otherwise unusable/inaccessible account (e.g., debits from a debit account) using a separate authorization computer and a virtual account identifier that is different from an access credential for the unusable account.

One embodiment of the invention is directed to a method comprising: receiving, by a first authorization computer via a first processing network, a first authorization request message comprising a virtual account identifier for a transaction to be conducted by a resource provider computer, determining an access credential associated with the virtual account identifier, generating a second authorization request message that includes the access credential, transmitting the second authorization request message to a second authorizing computer via a second processing network, receiving a second authorization response message for the second authorization request message from the second authorizing computer, and transmitting a first authorization response message to the resource provider computer.

Another embodiment of the disclosure is directed to a first authorization computer comprising: a processor; and a computer readable medium coupled to the processor, the computer readable medium comprising code, that when executed by the processor, causes the first authorization computer to: receive, via a first processing network, a first authorization request message comprising a virtual account identifier for a transaction to be conducted by a resource provider computer, determine an access credential associated with the virtual account identifier, generate a second authorization request message that includes the access credential, transmit the second authorization request message to a second authorizing computer via a second processing network, receive a second authorization response message for the second authorization request message from the second authorizing computer, and transmit a first authorization response message to the resource provider computer.

Yet another embodiment of the disclosure is directed to a user device comprising: a processor; and a computer readable medium coupled to the processor, the computer readable medium comprising instructions, that when executed by the processor, causes the user device to: establish a communication session with a first authorization computer, provide, via the communication session to the first authorization computer, an indication of an access credential associated with a second authorization computer, receive, via the communication session from the first authorization computer, a virtual account identifier associated with the access credential, provide, to a resource provider in relation to a transaction, the virtual account identifier, and receive, via the communication session from the first authorization computer, an indication that the transaction has been completed using the access credential.

These and other embodiments of the disclosure are described in further detail below.

BRIEF DESCRIPTION OF THE DRAWINGS

FIG. 6 depicts a flow diagram illustrating a process for conducting a transaction in accordance with at least some embodiments of the disclosure.

DETAILED DESCRIPTION

Figure 1:
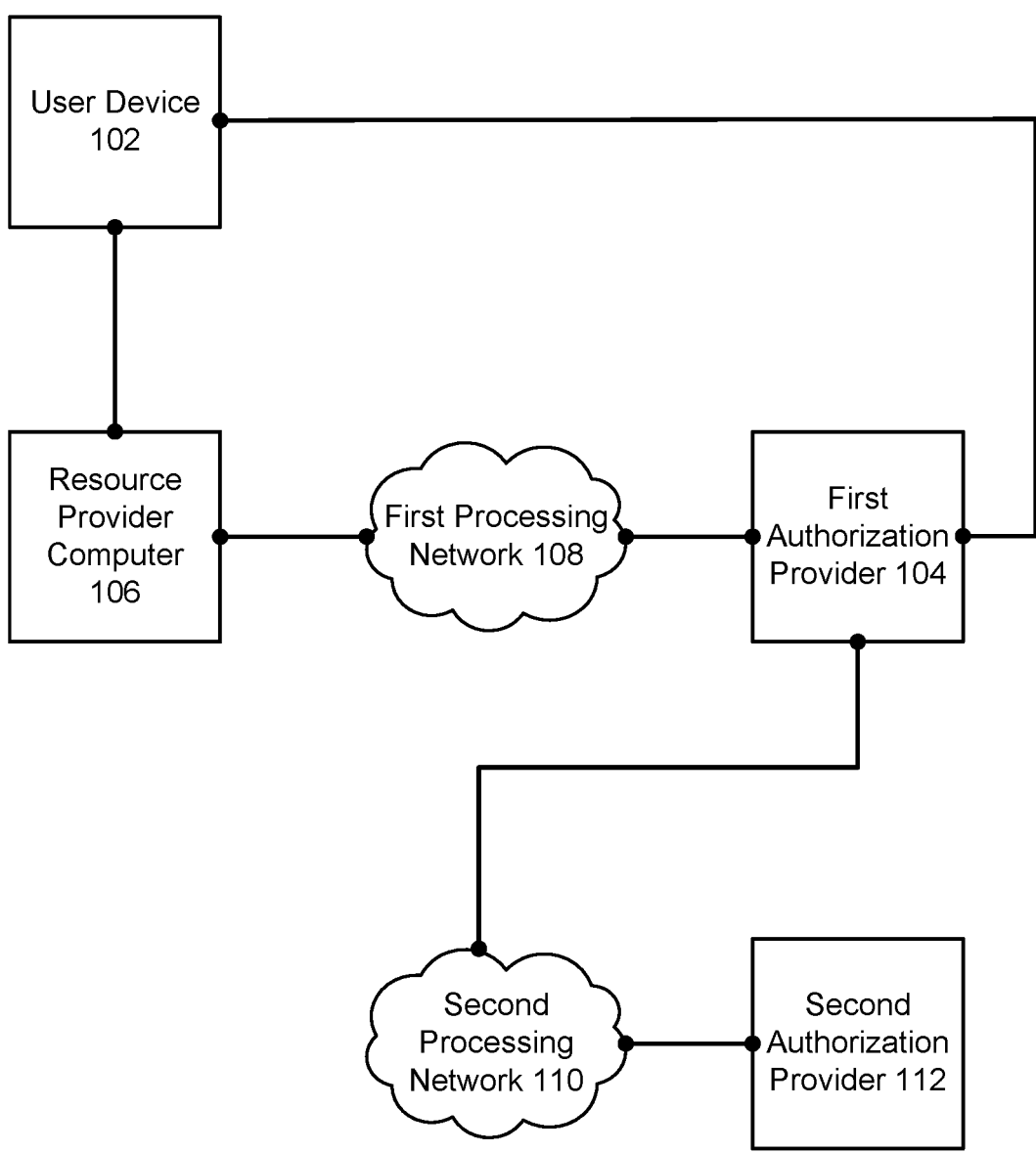
FIG. 1 depicts an illustrative example of a number of components that may be involved in a system for enabling access to an otherwise inaccessible processing network in accordance with at least some embodiments.

Embodiments of the present disclosure are directed to methods and systems for enabling resource providers to interact with access credentials that the resource provider is typically not capable of interaction with. In some embodiments, a virtual account identifier is issued in association with the access credential, the virtual account identifier being issued by an authorization provider which is different from the authorization provider having issued the access credential. The virtual account identifier may be provided to the resource provider in lieu of the access credential. The resource provider may then generate an authorization request message that includes the virtual account identifier, which may be routed to the authorization provider associated with the virtual account identifier. That authorization provider may then conduct the transaction using the access credential with the authorization provider having issued the access credential.

Prior to discussing specific embodiments of the invention, some terms may be described in detail.

A "communication device" may comprise any suitable electronic device that may be operated by a user, which may also provide remote communication capabilities to a network. A "mobile communication device" may be an example of a "communication device" that can be easily transported. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile communication devices include mobile phones (e.g. cellular phones), PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities. In some embodiments, a mobile communication device can function as a payment device (e.g., a mobile communication device can store and be able to transmit payment credentials for a transaction).

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

A "virtual account identifier" can include a number that resembles a real account number (e.g., can have the same format, but different numbers), but may be different from a real account number in that the user of the virtual account number may not have a permanent account with the issuer of the virtual account number. A virtual account number may have characteristics of a payment token. Also, a "virtual account number issuer" can have characteristics similar to a token service provider or a token service system. Features and functions of tokens (e.g., token domain controls" can also apply to virtual account numbers).

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, and verification values such as CVV, dCVV, CVV2, dCVV2, and CVC3 values.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like.

A digital wallet may be designed to streamline the purchase and payment process. A digital wallet may allow the user to load one or more payment cards onto the digital wallet so as to make a payment without having to enter an account number or present a physical card.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization enhances transaction efficiency and security.

A "token issuer," token provider" or "token service system" can include a system that services tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the tokens to obtain the actual PANs. In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

A "token domain" may indicate an area and/or circumstance in which a token can be used. Examples of token domains may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

A "token expiry date" may refer to the expiration date/ time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as an time duration as measured from the time of issuance.

A "token request message" may be an electronic message for requesting a token. A token request message may include information usable for identifying a payment account or digital wallet, and/or information for generating a payment token. For example, a token request message may include payment credentials, mobile device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key).

A "token response message" may be a message that responds to a token request. A token response message may include an indication that a token request was approved or denied. A token response message may also include a payment token, mobile device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key).

A "token requestor identifier" may include any characters, numerals, or other identifiers associated with an entity associated with a network token system. For example, a token requestor identifier may be associated with an entity that is registered with the network token system. In some embodiments, a unique token requestor identifier may be assigned for each domain for a token request associated with the same token requestor. For example, a token requestor identifier can identify a pairing of a token requestor (e.g., a mobile device, a mobile wallet provider, etc.) with a token domain (e.g., e-commerce, contactless, etc.). A token requestor identifier may include any format or type of information. For example, in one embodiment, the token requestor identifier may include a numerical value such as a ten digit or an eleven digit number (e.g., 4678012345).

A "user" may include an individual. In some embodiments, a user may be associated with one or more personal accounts and/or mobile devices. The user may also be referred to as a cardholder, account holder, or consumer in some embodiments.

A "resource provider" may be an entity that can provide a resource such as goods, services, information, and/or access. Examples of resource providers includes merchants, data providers, transit agencies, governmental entities, venue and dwelling operators, etc.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc.

An "issuer" may typically refer to a business entity (e.g., a bank) that maintains an account for a user. An issuer may also issue payment credentials stored on a communication device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a mobile communication or payment device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

FIG. 1 depicts an illustrative example of a number of components that may be involved in a system for enabling access to an otherwise inaccessible processing network in accordance with at least some embodiments. In FIG. 1, a user may operate a user device 102 to conduct a transaction with a resource provider. To do this, the user device 102 may be configured to obtain a virtual account identifier from a first authorization provider 104. The user device 102 may be further configured to interact with an access device in communication with a resource provider computer 106 in order to convey the virtual account identifier to the resource provider. The resource provider computer 106 may, in turn, be configured to transmit an authorization request message that includes the virtual account identifier, via a first processing network 108, to the first authorization provider 104. The first authorization provider 104 may then generate a second authorization request message to be routed over a second processing network 110 to a second authorization provider 112. The first authorization provider 110 may then obtain funds from the second authorization provider 114 before authorizing the transaction.

A user device 102 may include any device associated with a user 102 that can be used to conduct a transaction. In some embodiments, the user device 102 may be a payment device (e.g., a credit card). In some embodiments, the user device 102 may be a mobile device (such as a smart phone) that has payment capabilities. For example, the user device 102 may be a mobile device which has installed a contactless reader (e.g., radio frequency identification (RFID) or near-field communication (NFC)) capable of receiving data from, and communicating access credentials to, a resource provider computer 106. In another example, the user device 102 may be capable of displaying, on a display of the user device 102, a machine readable code which can be used to convey data to the resource provider computer 106. In some embodiments, the user device 102 may be associated with a particular user 102 or account via a relationship stored in a database. One skilled in the art would recognize that any identifier unique to the user device 102 (e.g., a phone number, an international mobile equipment identifier (IMEI), or serial number) may be used to identify a particular user or account associated with a transaction initiated via the user device 102.

A resource provider computer 106 may be any electronic device configured to manage access to one or more resources. The resource provider computer 108 may be a computing device that manages transactions initiated at a physical retail location or initiated electronically (e.g., an online sale). In some embodiments, the resource provider computer 106 may be a point-of-sale (POS) device. The resource provider computer 106 may be in communication with an access device capable of interacting with the user device 102. In some illustrative embodiments, an exemplary access device may be a card reader (e.g., a credit card reader), a machine-readable code reader (e.g., a barcode reader), a contactless reader (e.g., an RFID or NFC reader), or any other suitable mechanism for obtaining data from the user device 102.

A processing network (including the first processing network 108 and the second processing network 110) may be any grouping of electronic devices configured to receive authorization request messages and forward those authorization request messages to an appropriate authorization provider. A processing network may identify an appropriate authorization provider based on a banking identification number (BIN) included in an authorization request message. For example, a BIN may be included in a virtual account identifier provided to the user device 102 that causes authorization request messages to be routed to the first authorization provider 104. In some embodiments, the processing network may be configured to provide at least some authorization functionality. For example, the first processing network 106 may be configured to perform stand-in processing (STIP) when an authorization provider is unavailable.

It should be noted that different processing networks may have different requirements for interaction with that processing network. For example, some processing networks may require the use of different hardware. Accordingly, some resource providers may not have the technical capability to access one or more processing networks because of differences in functionality and/or data formats. For example, some resource providers may be configured to interact with particular credit processing networks, but not with others. In a second example, some resource providers may be configured to interact with credit processing networks, but not with debit processing networks. It is one of the objectives of the present disclosure to enable resource providers to interact with processing networks that are otherwise inaccessible to those resource providers. For example, in the example depicted in FIG. 1, the resource provider may be configured to interact with the first processing network 108, but may be incapable of interaction with the second processing network 110, or any authorization providers using that processing network. Embodiments of the disclosure enable interaction between the resource provider computer 106 and authorization providers using the second processing network 110.

An authorization provider (including the first authorization provider 104 and the second authorization provider 112) may be any electronic device configured to provide authorization (or approval) for a transaction. In some embodiments, the authorization provider may be a computing device operated by, or on behalf of, an issuer entity, the issuer entity having issued access credentials used in the transaction.

By way of illustrating an example transaction conducted using the system depicted in FIG. 1, consider the following scenario in which a user 102 conducts a transaction with a resource provider computer 106. In this scenario, the user 102 may first provide access credentials to the first authorization provider 104 to be used to complete a transaction. For example, the user device 102 may provide access credentials issued by the second authorization provider 112 to the first authorization provider 104, as well as any information needed to authenticate the user device 102 to the first authorization provider 104. Upon receiving the access credentials, the first authorization provider 104 may generate a virtual account identifier to be associated with those access credentials. In some embodiments, the virtual account identifier may be random or pseudo-random, such that the access credentials may not be derived from the virtual account identifier. The first authorization provider 104 may then provide the virtual account identifier to the user device 102.

The user of the user device 102, after receiving the virtual account identifier, may provide that virtual account identifier to a resource provider computer 106 in order to complete a transaction. For example, the user may put his mobile phone (having installed a payment application and having NFC capabilities) within the vicinity of an access device that has an NFC reader. In this example, the access device may be a contactless reader capable of communicating with the mobile device. The access device may, upon detecting the mobile device in its vicinity, provide transaction details to the mobile device and, in return, receive the virtual account identifier to be used in completing a transaction, which may then be communicated to the resource provider computer.

Upon receiving the virtual account identifier, the resource provider computer 106 may generate an authorization request message for the transaction that includes the virtual account identifier. The resource provider computer may then transmit the authorization request message to the first processing network 108 for authorization to be routed to the first authorization provider 104.

Upon receiving the authorization request message, the first authorization provider may, instead of determining whether to approve or decline the transaction, as may be done in a conventional system, identify the access credentials associated with a the virtual account identifier, generate a second authorization request message that includes that virtual account identifier, and transmit the second authorization request message to the second authorization provider 112 via the second processing network 110. The transaction may then be approved or declined by the second authorization provider. In some embodiments, the transaction may also be settled in real time. Upon receiving an approval, and in some cases upon receiving the funds from the second authorization provider 112, the first authorization provider 104 may generate an authorization response message that includes the virtual account identifier which indicates that the transaction is approved. That authorization response message may then be provided to the resource provider computer 106, which may subsequently complete the transaction.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the internet), using any suitable communication protocol.

Figure 2:
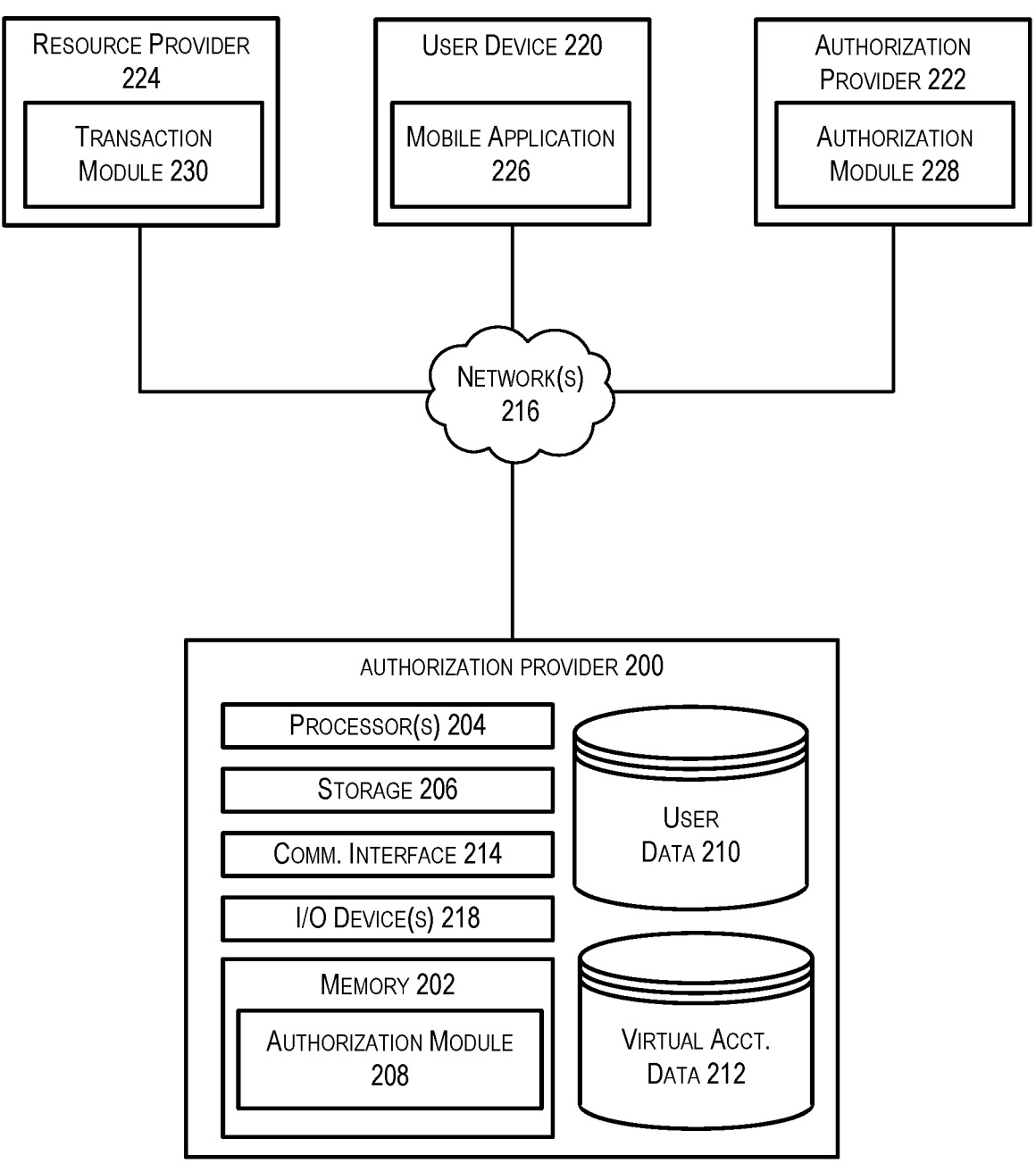
FIG. 2 depicts a diagram of an exemplary authorization provider computer that may be configured to enable interaction with a second authorization provider in accordance with at least some embodiments.

FIG. 2 depicts a diagram of an exemplary authorization provider computer 200 that may be configured to enable interaction with a second authorization provider 112 in accordance with at least some embodiments. The functionality attributed to the authorization provider computer 200 may be performed by the first authorization provider 104 described with respect to FIG. 1.

The authorization provider computer 200 may be any type of computing device capable of receiving context data and determining whether to approve a previously-declined transaction based on that context data. In at least some embodiments, the authorization provider computer 200 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of authorization provider computer 200, the memory 202 may be volatile (such as random access memory (RAM)) and/or non-volatile (such as read-only memory (ROM), flash memory, etc.). The authorization provider computer 200 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the authorization provider computer 200. In some embodiments, the memory 202 may include multiple different types of memory, such as static random access memory (SRAM), dynamic random access memory (DRAM) or ROM.

Turning to the contents of the memory 202 in more detail, the memory 202 may include an operating system and one or more application programs or services for implementing the features disclosed herein including at least a module for determining whether to approve or decline a transaction based on interactions with a second authorization provider (authorization module 208). The memory 202 may also include a number of data stores, including user data 210, which maintains information associated with individual users, and/or virtual account identifier data 212, which may maintain information on mappings between virtual account identifiers and access credentials. In some embodiments, the authorization provider computer 200 may maintain one or more accounts associated with a user.

In some embodiments, the authorization module 208 may, in conjunction with the processor 204, be configured to determine whether to authorize a transaction related to an authorization request message. In some embodiments, this may involve identifying an access credential currently mapped to the virtual account identifier indicated within the authorization request message, generating a second authorization request message that includes the access credential, and routing the second authorization request message to an authorization provider associated with the access credential. In some embodiments, the authorization module 208 may be configured to authorize the transaction upon receiving an authorization response message from the authorization provider that indicates the transaction is authorized for the access credential. In some embodiments, the authorization module 208 may be configured to authorize the transaction upon receiving an amount of funds sufficient to cover the transaction from the authorization provider.

The data stored in databases 210 and 212 may be dynamic, static, or some combination of dynamic and static data. In some embodiments, user data 210 may include any information about users. For example, user data 210 may include demographic data, internet search history data, purchase history data, clickstream data, or any other suitable information related to the user. In some embodiments, virtual account data 212 may include information about supplemental devices associated with various entities. For example, the virtual account data 212 may include information about mappings between access credentials and virtual account identifiers. In some embodiments, those mappings may be updated based on user input. For example, a user may log into an account maintained by the authorization provider 200 and indicate a different access credential that should be mapped to a virtual account identifier.

The authorization provider computer 200 may also contain communications interface(s) 214 that enable the authorization provider computer 200 to communicate with a stored database, another computing device or server, one or more remote devices, and/or any other suitable electronic devices. In some embodiments, the communication interface 214 may enable the authorization provider computer 200 to communicate with other electronic devices on one or more networks 216 (e.g., on a private network or a transaction processing network). The authorization provider computer 200 may also include input/output (I/O) device(s) and/or ports 218, such as for enabling connection with a keyboard, a mouse, a pen, a voice input device, a touch input device, a display, speakers, a printer, etc.

In some embodiments, the network 216 may include any one or a combination of many different types of networks, such as cable networks, the Internet, wireless networks, cellular networks, and other private and/or public networks. While the illustrated example depicts various electronic devices accessing the authorization provider computer 200 over the network 216, the described techniques may equally apply in instances where the electronic devices interact with the authorization provider computer 200 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

The authorization provider computer 200 may be in communication with a number of other electronic devices. For example, the authorization provider computer 200 may be in communication with user devices 220, authorization providers 222, and/or resource providers 224. Each of the user devices 220 may be capable of interacting with the authorization provider computer 200 to access an account and/or enroll access credentials. Additionally, in some embodiments the user devices 220 may be capable of interacting with a resource provider 224 to complete a transaction. In some embodiments, interaction between a user device 220 and a resource provider 224 may be enabled via a mobile application 226. For example, the user devices 220 may include a web browser or other suitable mobile application 226 that enables a user of the user device 220 to access a website maintained by the authorization provider computer 200 or resource provider 224.

The user device 220 may include one or more data transfer mechanisms capable of conveying information (e.g., payment device information) to an access device of the resource provider 224. For example, the user device 220 may include a display for presenting a machine-readable code to an access device, a contactless element for wirelessly transmitting information to the access device, or any other suitable data transfer means. In some embodiments, the user device 220 may include mobile application 226, which may be a set of computer executable instructions (e.g. an application) which, when executed, causes the user device 220 to provide information to an access device to conduct a transaction with a resource provider. In some embodiments, a mobile application 226 may be an application which is maintained on behalf of, and supported by, the authorization provider computer 200 or another entity. For example, in some embodiments, the mobile application 226 may be used to initiate transactions using virtual account identifiers made available by the authorization provider computer 200. In some embodiments, a user device 220 may be independently capable of storing (e.g., in memory) one or more virtual account identifiers (e.g., as generated by the authorization provider computer 200).

An authorization provider 222 may include any suitable computing device capable of determining whether to approve or decline a particular transaction conducted with respect to an account maintained by that authorization provider 222. In some embodiments, the authorization provider 222 may include, in its memory, one or more modules for determining whether to authorize a transaction (authorization module 228).

In some embodiments, a resource provider 224 may be any computing device capable of providing authorization request messages to the authorization provider 200. In some embodiments, the resource provider 224 may be a retailer (e.g., an electronic retailer) or some other resource provider which manages access to one or more resources (goods and/or services). In some embodiments, the resource provider 224 may include, in its memory, one or more modules for conducting a transaction for a resource (transaction module 230).

In some embodiments, the authorization provider computer 200 may maintain an account with respect to one or more user devices 220. It should be noted that an account maintained by the authorization provider computer 200 for the user device 220 may be different from an account maintained by a resource provider 224 for that same user device 220. Each of an authorization provider computer 200 and a resource provider 224 may separately maintain information related to a user in relation to their respective accounts.

Figure 3:
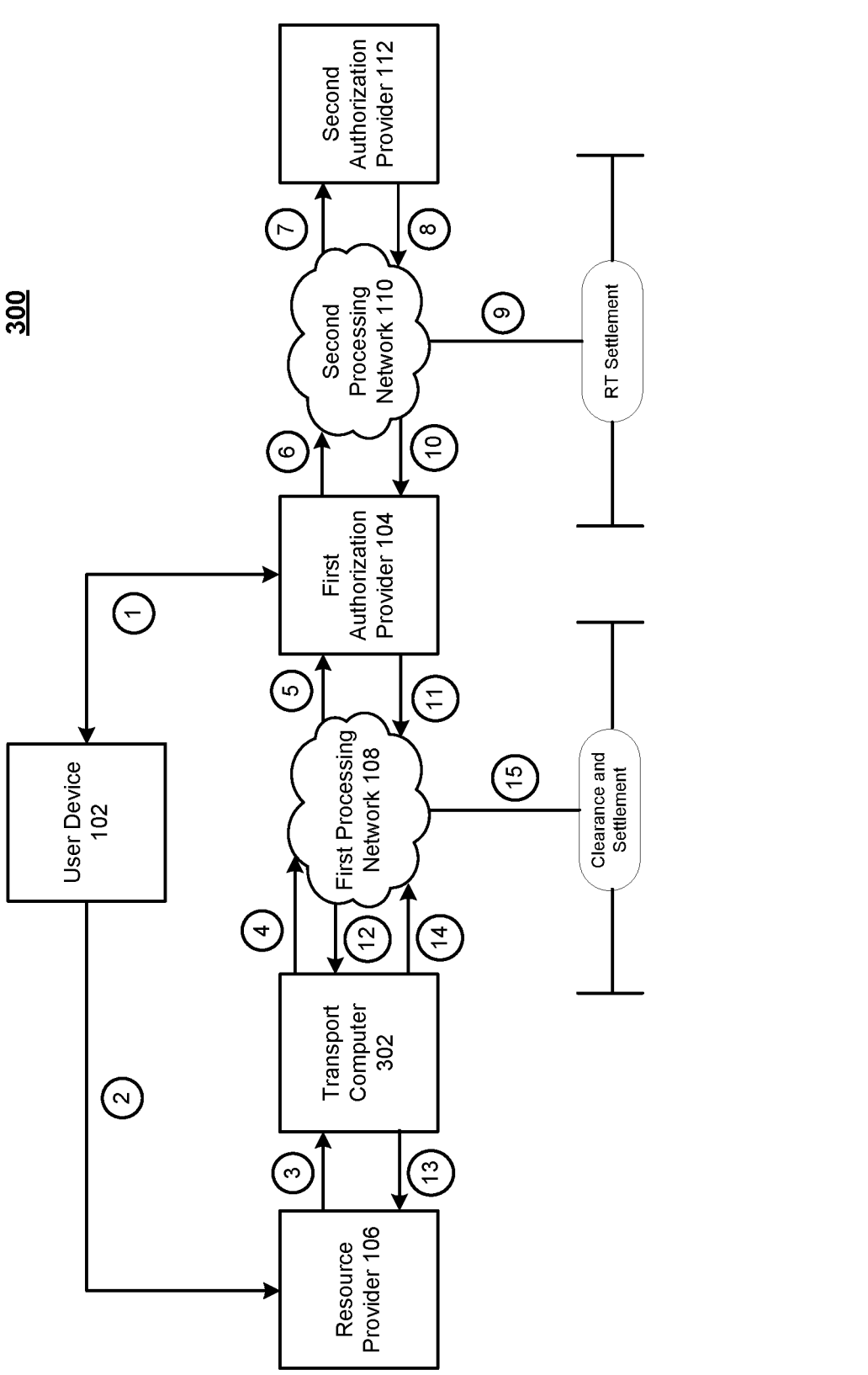
FIG. 3 depicts a flow chart illustrating an example process for providing functionality in accordance with at least some embodiments of the disclosure.

FIG. 3 depicts a flow chart illustrating an example process for providing functionality in accordance with at least some embodiments of the disclosure. The process 300 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 300 (or any other processes described herein, or variations and/or combinations thereof) may be performed under the control of one or more computer systems configured with executable instructions and may be implemented as code (e.g., executable instructions, one or more computer programs or one or more applications). In accordance with at least some embodiments, the process 300 of FIG. 3 may be performed by at least a portion of the components depicted in FIG. 1. The code may be stored on a computer-readable storage medium, for example, in the form of a computer program including a plurality of instructions executable by one or more processors. The computer-readable storage medium may be non-transitory.

Process 300 may begin at step 1, in which a payor authorizes a purchase by requesting a virtual account identifier from a first authorization provider 104, which may be an Issuer Processor. In some embodiments, this may be done through a partner mobile application such as Tez, Whatsapp, etc. In some embodiments, the first authorization provider 104 may obtain pre-authorization for a potential transaction at this time. This may involve generating an authorization request message for some predetermined maximum amount which includes access credentials associated with the user. The generated authorization request message may then be transmitted to a second authorization provider 112 for pre-authorization. The first authorization provider 104 may then record the payor's authorization, as well as the virtual account identifier associated with the authorization In step 2, the payor provides the virtual account identifier to a resource provider 106 to conduct a transaction. In some cases, the user uses a customer presented QR code to make a purchase at an access device (such as a POS terminal) at a resource provider such as a merchant. The resource provider may operate a resource provider computer 106, which may be the access device or may be another computer in communication with the access device.

In step 3, the resource provider (e.g., a merchant) captures the virtual account identifier and sends a first authorization request message to a transport computer 302 such as one that may be operated by an Acquirer Processor. The first authorization request message may contain a specific first amount for the purchase being conducted as well as other details of the transaction. In some embodiments, the virtual account identifier may be formatted similar to a sixteen digit primary account number (PAN) or a tokenized PAN.

In step 4, the transport computer 302 operated by the Acquirer Processor passes the first authorization request message, which may be a standard ISO 8583 dual message authorization request to a first processing network computer, which may be a computer in a payment processing network (such as VisaNet). The first processing network computer may identify the first authorization provider 104 based on a portion of the virtual account identifier included within the authorization request message.

In step 5, the processing computer in the first processing network (e.g., VisaNet) sends the first authorization request message (e.g., a standard ISO 8583 dual message authorization request) to the first authorization provider 104. In some embodiments, the first authorization provider 104 may be operated by an Issuer Processor. The first authorization provider 104 may be an example of the authorization provider 200 described with respect to FIG. 2 above.

In step 6, the first authorization provider 104 may optionally validate the first authorization request message based on information received in relation to the access credential and virtual account identifier from step 1 above. In some embodiments, the first authorization provider 104 may map information included in the authorization request message to a format compliant with a unified payments interface (UPI) specification. In some embodiments, the first authorization provider 104 may translate the access credential (e.g., a primary account number or payment token) to a unified payments interface identifier (e.g., a 7 digit UPI ID) or other identifier (e.g., a debit account identifier). The first authorization provider 104 may then create a second authorization request message that includes the unified payments interface identifier. In some embodiments, the second authorization request message may include an ISO 20022 debit request message. The authorization computer may then send the second authorization request message to a second process network 110 (e.g., the UPI). The second process network 110 may be operated by an interface computer, which may be separate from the first authorization computer or a second authorization provider 112 operated by the Payor's Bank. The interface computer may maintain a database of payment account identifiers and tokens, mapped to unified payments interface identifiers. In some embodiments, the unified payments interface identifiers may be different than or the same as an account identifier (e.g., a debit account identifier) used by the Payor's Bank.

In step 7, the UPI (i.e., the interface computer) sends the second authorization request message (e.g., the ISO 20022 debit request message) with the UPI ID to the second authorization computer 112 operated by the Payor's Bank. The second authorization request message may include a second amount, which may be the same as or substantially equal to the first amount. If fees are assessed, then the second amount may be greater than the first amount. If fees are assessed at a later time, or if no fees are assessed, then the first amount may equal the second amount.

In step 8, second authorization provider 112 operated by the Payor Bank validates there are sufficient funds in the account associated with the UPI ID. If so, the first authorization provider 104 debits the Payor's account. The second authorization provider 112 then generates and sends a second authorization response message such as an ISO 20022 debit response to the second processing network 110.

In step 9, the second processing network 110 performs a real-time settlement between the second authorization provider 112 operated by the Payor Bank, and the first authorization provider 104. This may involve a transfer of funds from the account maintained by the second authorization provider 112 to an account maintained by the first authorization provider 104. In some embodiments, the account maintained by the first authorization provider 104 may be a temporary account.

In step 10, the second processing network 110 sends the second authorization response message or a confirmation message, such as an ISO 20022 confirmation message to the first authorization provider 104.

In step 11, the first authorization provider 104 converts the UPI identifier to the access credential that was identified with respect to the first authorization request message. It then credits the push payment funds to the account associated with the user and places a hold on the funds. If a payment token was used, then the payment token may need to be converted to an underlying account identifier before performing the credit process. The first authorization provider 104 then converts the second authorization response message (e.g., the confirmation message ISO 20022 confirmation message) to a first authorization response message (e.g., an ISO 8583 authorization response message) that includes the virtual account identifier and sends it to the first processing network 108 (e.g., VisaNet).

In step 12, the processing computer in the first processing network 108 (e.g., VisaNet) sends the first authorization response message (e.g., the ISO 8583 authorization response with the Visa PAN or token) back to the transport computer 302 operated by the Acquirer Processor.

In step 13, the transport computer 302 operated by the Acquirer Processor sends the first authorization response message to the resource provider computer 106 operated by the merchant, and the purchase is then completed by the merchant.

In step 14, after completion of the transaction, the transport computer 302 operated by the Acquirer Processor submits to a processing computer in the first processing network 108 (e.g., VisaNet), clearing data for the transaction along with all other card clearing data.

In step 15, processing computer in the first processing network 108 (e.g., VisaNet) clears and settles the purchase between the Acquirer Processor and the first authorization provider 104. This may involve transferring funds from an account maintained by the first authorization provider 104 to an account maintained by the Acquirer Processor.

After completion of the process 300 described above, the first authorization provider 104 may receive the clearing data, post the debit to the account associated with the account identifier or payment token in first authorization request message (e.g., a Digital Demand PAN account) based upon the clearing data, and receive the settlement from the processing computer in the processing network (e.g., Visa). In addition, the first authorization provider 104 can validate that all accounts such as Digital Demand PAN accounts have a zero balance. Exceptions may result in reversal message processing between the second processing network 110 and the Payor Bank to credit funds back to the Payor's bank account.

Figure 4:
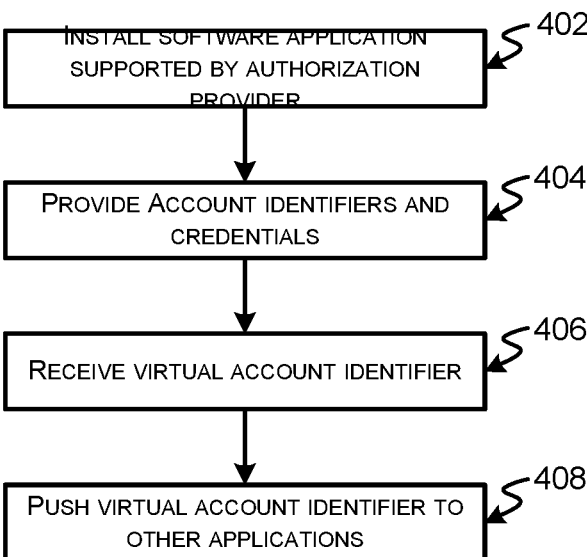
FIG. 4 depicts a flow chart illustrating an example process for providing user enrollment in accordance with at least some embodiments of the disclosure.

FIG. 4 depicts a flow chart illustrating an example process for providing user enrollment in accordance with at least some embodiments of the disclosure. In some embodiments, the process 400 may be performed by a user device. For example, process 400 may be performed on an instance of the user device 102 as depicted in FIG. 1.

Process 400 may begin at 402, when a software application supported by an authorization provider is installed on the user device. The authorization provider may be an example of authorization provider 200 described with respect to FIG. 2 above, and may provide functionality attributed to a first authorization provider. In some embodiments, the software application may be a software application maintained by, or on behalf of, the authorization provider. Upon execution of the software application on the user device, the user device may be caused to establish communication with the authorization provider. In some embodiments, a user may be required to create and/or login into an account maintained by the authorization provider upon its execution before certain information can be provided to the user device by the authorization provider.

At 404, a user may provide one or more identifiers for accounts to be used in completing a transaction. In some embodiments, the user may also provide account credentials to authenticate the user and/or the account. For example, in the case that the account identifier is a credit card number, the user may be required to provide a card verification value (CVV) for that card to prove possession of the card. In some embodiments, the software application may be configured to cause the user device to collect a biometric sample (e.g., a fingerprint) to be used to authenticate the user.

In some embodiments, the authorization provider may pre-authorize a transaction or generate an authorization request message for a nominal amount in order to authenticate the account. For example, upon receiving an account identifier, the authorization provider may initiate a transfer of some nominal amount into the account indicated via the identifier. In some embodiments, the authorization provider may then require a user to verify the nominal amount in order to authenticate that the user has access to the account associated with the account identifier. In some embodiments, the authorization provider may, each time that a user initiates the software application to conduct a transaction, generate an authorization request message to an authorization entity associated with the identified account for some predetermined amount in order to gain pre-approval for the transaction.

At 406, the user device may receive a virtual account identifier for each of the provided one or more account identifiers. Each virtual account identifier may be formatted in a manner similar to a credit card number, with the first six digits (the BIN) identifying the authorization provider and with the remaining 10 digits identifying an account to be associated with a particular account identifier.

In some embodiments, the user device may be caused to push one or more virtual account identifiers to other software applications installed on the user device at 408. For example, upon receiving a virtual account identifier, the software application may cause the user device to identify one or more payment applications installed on the user device (e.g., Apple Pay, Samsung Pay, Google Pay, etc.). Once one or more payment applications have been identified, the user device may provide the virtual account identifier to those payment devices to be presented as a payment option.

Figure 5:
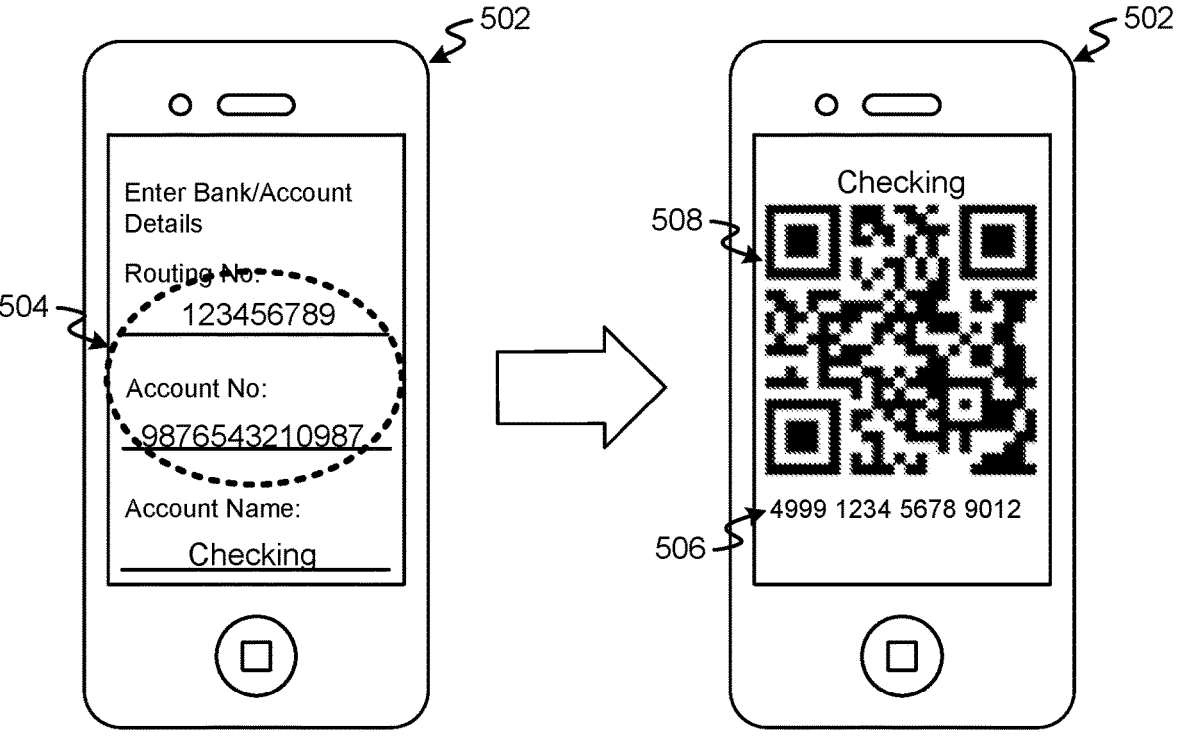
FIG. 5 depicts an illustrative example of a user interaction that may be conducted in accordance with at least some embodiments of the disclosure.

FIG. 5 depicts an illustrative example of a user interaction that may be conducted in accordance with at least some embodiments of the disclosure. In FIG. 5, a graphical user interface (GUI) is depicted for a mobile application installed, and executed, upon a user device 502. Upon execution, the mobile application may establish a communication session with a authorization provider (such as the authorization provider 200 described with respect to FIG. 2 above). In some embodiments, the mobile device may prompt a user of the user device 502 to provide login credentials in order to access an account maintained by the authorization provider computer 200.

In some embodiments, a user of the user device 502 may provide one or more account credentials to the authorization provider via the mobile application. Access credentials may include any information used to identify and access an account. For example, as depicted in FIG. 5, access credentials may include a routing number and an account number that may be used to access a bank account or other type of account. In some embodiments, access credentials may include a credit card number or a payment token.

Upon receiving the access credentials, the authorization provider may generate a virtual account identifier 506 to be associated with the access credentials 504. In some embodiments, the virtual account identifier 506 may be presented in a machine-readable format. For example, the virtual account identifier 506 may be presented in a manner such that it may be obtained using a barcode reader or other optical reader. More particularly, the virtual account identifier 506 may be presented as a machine-readable code 508, such as a barcode, quick response (QR) code, or other suitable format.

In some embodiments, the mobile application may store the received virtual account identifier 506 in memory for access by the user device 502 at a later time. In some embodiments, a user may request the virtual account identifier 506 each time that he or she wishes to initiate a transaction. In some embodiments, the authorization provider may obtain pre-authorization for a transaction from an authorization provider associated with the access credentials upon receiving a request for the virtual account identifier 506.

FIG. 6 depicts a flow diagram illustrating a process for conducting a transaction in accordance with at least some embodiments of the disclosure. Process 600 may be performed on a service computer, such as the service computer 200 described with respect to FIG. 2 above.

Process 600 may begin at 602, when a first authorization message is received that includes a virtual account identifier. In some embodiments, the first authorization request message may be received from a transport computer associated with the resource provider computer. Additionally, the first authorization response message may be transmitted to the resource provider computer via the transport computer. In some embodiments, the virtual account identifier may be formatted as a 16 digit number including a six-digit banking identification number. The first authorization request message may be received via a first processing network, which may be a payment processing network configured to process credit card transactions.

At 604, process 600 may involve determining an access credential associated with the virtual account identifier. In some embodiments, the access credential may be an account number for a funded debit account.

At 606, process 600 may involve generating a second authorization request message that includes the access credential. In some embodiments, the first authorization request message may include a first amount and the second authorization request message may include a second amount, the first amount may be equal to or substantially equal to the second amount.

At 608, process 600 may involve transmitting the second authorization request message to a second authorization computer. In some embodiments, the process 600 may further involve, prior to transmitting the second authorization request message to the second authorization computer via the second processing network, determining a level of risk associated with the transaction. For example, the first authorization computer may determine a likelihood that the transaction is fraudulent based on factors associated with the transaction. In some embodiments, the second authorization request message may not be transmitted if the level of risk associated with the transaction is greater than a threshold risk value. In some embodiments, the second processing network may be a payment processing network configured to process debit transactions.

At 610, process 600 may involve receiving a second authorization response message from the second authorization computer. In some embodiments, the second authorization response message may include an indication as to whether the funded debit account includes sufficient funds to cover the transaction.

At 612, process 600 may involve generating and transmitting a first authorization response message. In some embodiments, the process may further involve receiving an indication that an amount indicated in the second authorization request message has been transferred from an account maintained by the second authorization computer to an account maintained by the first authorization computer. In some embodiments, the first authorization response message is not transmitted to the resource provider computer until the amount has been transferred. In some embodiments, the access credential is replaced with the virtual account identifier in the first authorization response message.

In some embodiments, the process may involve, prior to the transaction, receiving, from a user device, an indication of the access credential, generate the virtual account identifier, and provide the virtual account identifier to the user device. In some embodiments, the virtual account identifier may be provided to the user device in a machine-readable format. In some embodiments, upon receiving a request for the virtual account identifier from a user device, the process may involve obtaining pre-authorization for the transaction.

Embodiments of the disclosure provide for a number of advantages over conventional systems. For example, embodiments of the invention enable a resource provider (e.g., a merchant) to accept payment from sources that it would typically not be configured to, or may lack infrastructure to, accept payment from. Conversely, the system also enables users to utilize payment sources that may not be accepted via conventional payment systems. For example, users who may not have access to credit cards (e.g., users with poor credit) are able to use their bank account to complete a transaction at a merchant which typically only accepts credit cards or cash.

Additionally, embodiments of the invention provide greater security to consumers. On one hand, the system prevents resource providers from obtaining the consumers' access credentials, which prevents unauthorized use of the access credentials by employees of the resource provider which may have access to those access credentials. Additionally, some authorization providers (such as those maintaining debit accounts) may not perform fraud analysis and prevention processes to the same level as other authorization providers. The system described herein enables additional fraud prevention steps to be performed (e.g., by the first authorization provider in addition to the authorization provider that issued the access credentials). This gives consumers greater flexibility in protecting their assets and the ability to maintain a minimum level of security for each of their accounts.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

receiving, by a first authorization computer, a request for a virtual account identifier from a user device, wherein the request includes an account identifier for an account issued by a second authorization computer, wherein the account identifier is in a first format not compatible with a resource provider computer, wherein the account identifier is a foreign payment system interface identifier compliant with a foreign payment system interface;

generating, by the first authorization computer, the virtual account identifier for the account issued by the second authorization computer, wherein the virtual account identifier transforms the account issued by the second authorization computer, which is not accepted by the resource provider computer, into an acceptable credential with the resource provider computer, wherein the virtual account identifier is in a second format compatible with the resource provider computer;

generating, by the first authorization computer, a token representing the virtual account identifier;

transmitting, by the first authorization computer, the token to the user device, wherein the token is provisioned on a digital wallet application installed on the user device;

receiving, by the first authorization computer from a transport computer associated with the resource provider computer via a first processing network, a first authorization request message comprising the token associated with the virtual account identifier for a transaction to be conducted with the resource provider computer;

detokenizing, by the first authorization computer, the token to obtain the virtual account identifier;

validating, by the first authorization computer, the first authorization request message by:

determining, by the first authorization computer, the account identifier in the first format associated with the virtual account identifier;

mapping the virtual account identifier to the account identifier in the first format that is compliant with the foreign payment system interface;

generating, by the first authorization computer, a second authorization request message that includes the account identifier in the first format;

transmitting, by the first authorization computer, the second authorization request message to the second authorization computer via a second processing network, wherein the second processing network is a foreign payment system interface network;

receiving, by the first authorization computer, a second authorization response message for the second authorization request message from the second authorization computer;

prior to authorizing the transaction initiated with the virtual account identifier:

receiving, by the first authorization computer via the second processing network, an indication that an amount indicated in the second authorization request message has been transferred from the account issued by the second authorization computer to an account issued by the first authorization computer;

authorizing, by the first authorization computer, the transaction initiated with the token associated with the virtual account identifier at the resource provider computer based on the amount being transferred to the account issued by the first authorization computer;

generating, by the first authorization computer, a first authorization response message authorizing the transaction based on the second authorization response message, wherein the first authorization response message includes the token associated with the virtual account identifier generated by the first authorization computer whereas the transaction is processed using the account issued by the second authorization computer;

transmitting, by the first authorization computer via the first processing network, the first authorization response message to the resource provider computer via the transport computer associated with the resource provider computer;

performing, by the first authorization computer, a clearing and settlement process with the transport computer; and validating, by the first authorization computer, that a virtual account associated with the virtual account identifier has zero balance upon completion of the clearing and settlement process.

2. The method of claim 1, wherein the first authorization request message includes a first amount and the second authorization request message comprises a second amount, the first amount being equal to or substantially equal to the second amount.

3. The method of claim 1, wherein the virtual account identifier is formatted as a 16 digit number including a six-digit banking identification number.

4. The method of claim 1, wherein the account identifier comprises an account number for a funded debit account.

5. The method of claim 4, wherein the second authorization response message includes an indication as to whether the funded debit account includes sufficient funds to cover the transaction.

6. The method of claim 1, further comprising, prior to transmitting the second authorization request message to the second authorization computer via the second processing network, determining a level of risk associated with the transaction.

7. The method of claim 6, wherein the second authorization request message is transmitted based on the level of risk associated with the transaction being lower than a threshold risk value.

8. The method of claim 1, further comprising:

performing a fraud analysis for the transaction by the first authorization computer in addition to a subsequent fraud analysis performed by the second authorization computer that authorizes or declines the transaction.

9. The method of claim 1, wherein the first authorization computer is configured to issue a first set of accounts and authorize transactions initiated using the first set of accounts.

10. The method of claim 1, wherein the foreign payment system interface is unified payments interface (UPI).

11. A first authorization computer comprising:

a processor; and a computer readable medium coupled to the processor, the computer readable medium comprising instructions, that when executed by the processor, causes the first authorization computer to:

receive a request for a virtual account identifier from a user device, wherein the request includes an account identifier for an account issued by a second authorization computer, wherein the account identifier is in a first format not compatible with a resource provider computer, wherein the account identifier is a foreign payment system interface identifier compliant with a foreign payment system interface;

generate the virtual account identifier for the account issued by the second authorization computer, wherein the virtual account identifier transforms the account issued by the second authorization computer, which is not accepted by the resource provider computer, into an acceptable credential with the resource provider computer, wherein the virtual account identifier is in a second format compatible with the resource provider computer;

generate a token representing the virtual account identifier, wherein the token is provisioned on a digital wallet application installed on the user device;

transmit the token to the user device, wherein the token is provisioned on a digital wallet application installed on the user device;

receive, from a transport computer associated with the resource provider computer via a first processing network, a first authorization request message comprising the token associated with the virtual account identifier for a transaction to be conducted with the resource provider computer;

detokenize the token to obtain the virtual account identifier;

validate the first authorization request message by:

determining the account identifier in the first format associated with the virtual account identifier;

mapping the virtual account identifier to the account identifier in the first format that is compliant with the foreign payment system interface;

generate a second authorization request message that includes the account identifier in the first format;

transmit the second authorization request message to the second authorizing computer via a second processing network, wherein the second processing network is a foreign payment system interface network;

receive a second authorization response message for the second authorization request message from the second authorization computer;

prior to authorizing the transaction initiated with the virtual account identifier:

receive, via the second processing network, an indication that an amount indicated in the second authorization request message has been transferred from the account issued by the second authorization computer to an account issued by the first authorization computer;

authorize the transaction initiated with the token associated with the virtual account identifier at the resource provider computer based on the amount being transferred to the account issued by the first authorization computer;

generate a first authorization response message authorizing the transaction based on the second authorization response message, wherein the first authorization response message includes the token associated with the virtual account identifier generated by the first authorization computer whereas the transaction is processed using the account issued by the second authorization computer;

transmit, via the first processing network, the first authorization response message to the resource provider computer, via the transport computer associated with the resource provider computer;

perform a clearing and settlement process with the transport computer; and validate that a virtual account associated with the virtual account identifier has zero balance upon completion of the clearing and settlement process.

12. The first authorization computer of claim 11, wherein the instructions further cause the first authorization computer to:

provide the virtual account identifier to the user device.

13. The first authorization computer of claim 12, wherein the virtual account identifier is provided to the user device in a machine-readable format.

14. The first authorization computer of claim 11, wherein the instructions further cause the first authorization computer to, upon receiving a request for the virtual account identifier from the user device, obtain pre-authorization for the transaction.

15. The first authorization computer of claim 11, wherein the first processing network is a payment processing network configured to process credit card transactions.

16. The first authorization computer of claim 11, wherein the second processing network is a payment processing network configured to process debit transactions.

* * * * *